(12) United States Patent
Koide

(10) Patent No.: US 6,439,727 B1
(45) Date of Patent: Aug. 27, 2002

(54) BARRIER MEMBER FOR A TELESCOPE

(75) Inventor: Wataru Koide, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/426,252

(22) Filed: Oct. 25, 1999

(30) Foreign Application Priority Data

Oct. 27, 1998 (JP) .......................................... 10-306034

(51) Int. Cl.[7] .......................... G03B 11/04; G02B 21/00; F21V 9/01
(52) U.S. Cl. .......................... 359/511; 359/399; 359/611
(58) Field of Search .................................. 359/227, 404, 359/405, 406, 407, 408, 409, 412, 417, 418, 419, 480, 481, 503, 506, 507, 508, 511, 600, 610, 611, 612, 399; 33/244, 245

(56) References Cited

U.S. PATENT DOCUMENTS 5,486,889 A * 1/1996 Shintani .................... 359/511
5,631,772 A * 5/1997 Mizukawa .................. 359/511

* cited by examiner

*Primary Examiner*—Cassandra Spyrou
*Assistant Examiner*—Jennifer Winstedt
(74) *Attorney, Agent, or Firm*—Ostrolenk, Faber, Gerb & Soffen, LLP

(57) ABSTRACT

Binoculars, one form of telescope, in accordance with the present invention have a lens frame drive responsive to manipulating a focusing ring. Lens frames are driven to advance or withdrawn by means of the lens frame drive. The lens frames are driven to thrust from their positions of collapse to other positions, at which they enable observation, by manipulating the focusing ring. At this time, lens barriers covering the front surfaces of the lens frames are pressed by means of projections, and thus driven from positions at which they block objectives to other positions at which they free the objectives. Withdrawal of the lens barriers and thrusting of the lens frames can be achieved merely by manipulating the focusing ring. Changing the lens barriers from their positions of protection to their positions of withdrawal can be achieved with the simple manipulation.

4 Claims, 9 Drawing Sheets

BARRIER MEMBER FOR A TELESCOPE

BACKGROUND OF THE INVENTION

1. Field of the Invention

The present invention relates to a telescope having a barrier member for protecting an optical system.

2. Description of the Related Art

In general, that are one form of telescopes, have objectives and eyepieces, which are located at the front and back ends of paired lens barrels, exposed externally. When the binoculars are unused (stowed), if they are left intact, dust or oil and fat adhere to the surfaces of the lenses. When the adhering dust is wiped away, the lenses may be damaged. In conventional binoculars, a lens cap serving as an optical system protecting member is provided for groups of objectives and eyepieces in each of the right and left lens barrels.

However, the lens cap is merely mounted on the circumference of each lens barrel. The lens cap therefore readily comes off due to an extraneous force or the like. Moreover, there is a fear that the lens cap may be lost. For preventing the loss, a proposal has been made of binoculars having one end of each lens cap thereof coupled to the body of each lens barrel using a string-like member. However, the binoculars having one end of each lens cap coupled to the body of each lens barrel using the string-like member are hard to handle because the dismounted lens caps swing. Moreover, the appearance of the binoculars having the dismounted lens caps swinging is unfavorable.

Binoculars having a barrier, which can slide, mounted on the front surface of each lens have been proposed in the past. Before the binoculars are used, a barrier handler is manipulated in order to move the barrier. The lenses are thus freed. Thereafter, the lenses are focused and observation is carried out.

However, in the conventional binoculars having the barrier mounted on the surface of each lens, before observation is started, the barriers must be manipulated in order to focus the lenses. The manipulation of the barriers and a manipulation to be performed for focusing are independant and annoy a user. Moreover, since both a mechanism for driving the barriers and a mechanism for focusing the lenses must be included, the structure of the binoculars may become complex.

SUMMARY OF THE INVENTION

Accordingly, an object of the present invention is to provide a telescope whose usable state and unused state can be changed by moving a barrier member to a position of withdrawal and a position of protection relative to an optical system. Herein, the barrier member can be readily changed from the position of protection to the position of withdrawal.

According to the present invention, a telescope has a barrel, an optical system moving mechanism, and a barrier member. The lens barrel bears an optical system. The optical system moving mechanism is used to move the optical system between a position of non-use and a position of use. The barrier member can move to a position of protection at which it protects the front surface of the optical system and a position of withdrawal at which it has withdrawn from the front surface of the optical system. The barrier member is moved to the position of protection or the position of withdrawal responsively to a manipulation performed on the optical system moving mechanism. The barrier member can thus readily be changed from one state to the other.

The other features of the present invention and advantages thereof will be fully apparent from the description below.

DESCRIPTION OF THE PREFERRED EMBODIMENTS

Embodiments of the present invention will be described in conjunction with the drawings.

The structure of binoculars 1, shown as a telescope in FIGS. 2–14, in accordance with the first embodiment of the present invention, will be described using FIG. 1 and FIG. 2.

Figure 1:
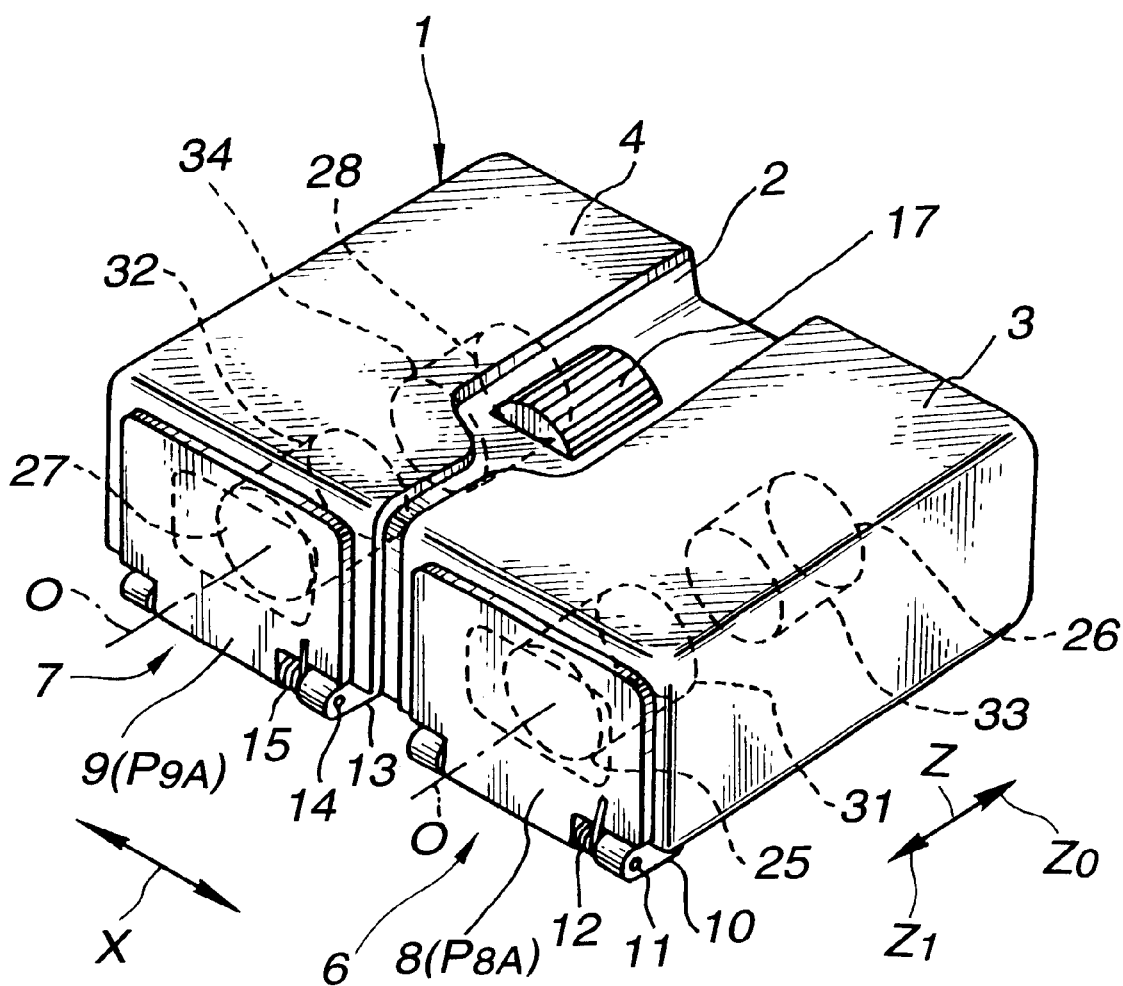
FIG. 1 is a perspective view showing the appearance of binoculars in accordance with the first embodiment of the present invention.

FIG. 1 is a perspective view showing the appearance of the binoculars 1 of the first embodiment of the present invention. FIG. 2 is an exploded oblique view of a lens frame drive and barrier mechanism incorporated in the binoculars 1.

In the description to be made below, an optical axis O is the optical axis of an observation optical system included in the binoculars, and Z directions are directions parallel to the optical axis O. A direction Z0 out of the Z directions is a direction towards an eyepiece, and a direction Z1 is a direction towards an objective. Directions X are rightward and leftward directions orthogonal to the optical axis O. A direction of rotation D0 is a clockwise direction relative to the eyepiece, and a direction of rotation D1 is a counterclockwise direction relative to an observer (see FIG. 2). These reference numerals will also be applied to subsequent embodiments.

Figure 2:
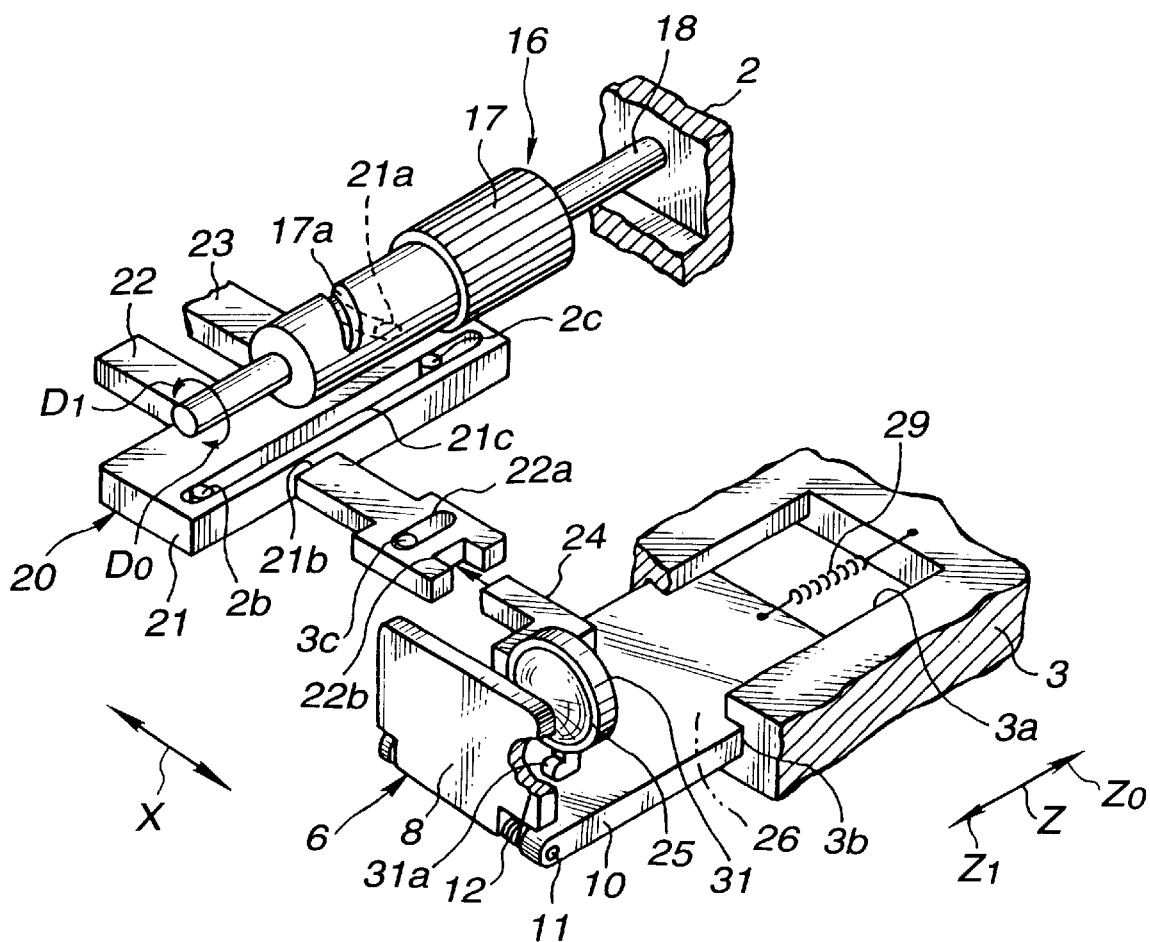
FIG. 2 is an exploded oblique view showing a lens frame drive and barrier mechanism which are incorporated in the binoculars of the first embodiment.

The binoculars 1 of the present embodiment have, as shown in FIG. 1 and FIG. 2, a body 2, a lens barrel bearing frame 3, a lens barrel bearing frame 4, lens frames 31 and 33, lens frames 32 and 34, left and right barrier mechanisms 6 and 7, a lens frame drive 20, and a lens frame handling unit 16. The lens barrel bearing frame 3 is supported to be able to slide leftward relative to the body 2, and slid for accommodating a user's pupil distance. The lens barrel bearing frame 4 is fixed to the body 2. The lens frames 31 and 33 holding a left objective and eyepiece 25 and 26 serving as an observation optical system are borne by the lens barrel bearing frame 3 so that the lens frames can advance or withdraw freely. The lens frames 32 and 34 holding a right objective and eyepiece 27 and 28 are borne by the lens barrel bearing frame 4. The left and right barrier mechanisms 6 and 7 include left and right lens barriers 8 and 9 that are barrier members. The lens frame drive 20 drives the lens frames, which are optical system thrusting means, so that the lens frames will advance or withdraw. The lens frame handling unit 16 drives the lens frame drive 20 so as to focus the lenses and open or close the barriers.

The barrier mechanism 6 as shown in FIG. 2, consists of a slide base 10, a spring 29, a lens barrier 8, and a torsion spring 12. The slide base 10 that is a sliding member is supported by a guide groove 3b bored in a stowage chamber 3a of the lens barrel bearing frame 3 so that the slide base 10 can freely slide in the Z directions. The spring 29 serving as a second constraining means constrains the slide base 10 to move in the direction Z0. The lens barrier 8 is supported by a support shaft 11 at the distal end of the slide base 10 so that the lens barrier 8 can pivot freely. The torsion spring 12 serving as a first constraining means constrains the lens barrier 8 to pivot in a direction in which the objective is protected (shielded).

The lens barrier 8 is a member movable to a position of protection (position of blocking) P8A at which it protects the objective or a position of withdrawal (position of freeing) P8B at which it has withdrawn into the stowage chamber 3a. The position of withdrawal P8B is a position at which the lens barrier 8 has withdrawn from the front surface of the objective, due to a sliding movement in the direction Z0 made by the slide base 10, after pivoting in a direction of freeing. A manipulation knob 10a is formed on the lower side of the slide base 10.

The barrier mechanism 7 has the same structure as the barrier mechanism 6. The barrier mechanism 7 consists of a slide base 13, a spring, a lens barrier 9, and a torsion spring 15. The slide base 13 is supported to be able to freely slide. The spring serving as a second constraining means that is not shown constrains the slide base 13 to move in the direction Z0. The lens barrier 9 is supported by a support shaft 14 so that it can rotate freely. The torsion spring 15 serving as a first constraining means constrains the lens barrier 9 to move in the direction of blocking.

The lens frame handling unit 16 consists of a focusing ring 17, a cam unit, and a support shaft 18. The focusing ring 17 can be manipulated externally. The cam unit is united with the focusing ring 17 and has a cam groove 17a that serves as an optical system thrusting means. The support shaft 18 is borne by the body 2 so that it can rotate freely, and supports the focusing ring 17 and cam unit.

The lens frame drive 20 has a drive base 21, a slide plate 22, and a support plate 23. The drive base 21 has a slave pin 21a and a guide groove 21c, and is borne by the body 2 so that it can slide freely in the Z directions over a distance defined by guide pins 2b and 2c. The slave pin 21a is engaged with-the cam groove 17a so that it can slide freely. The slide plate 22 is borne by a guide groove 21b in the-drive base 21 so that it can slide freely in the X directions. The slide plate 22 can freely slide in the Z directions in the lens barrel bearing frame 3 over a distance defined by a guide groove 22a while being interlocked with the drive base 21. The support-plate 23 is fixed to the drive base 21 and bears the right lens frame 32 so that the right lens frame can slide freely.

A lens frame support 24 is fixed to the lens frame 31 holding the left objective. A projection 31a is projecting from the lower part of the lens frame 31. The lens frame support 24 is always engaged with an engagement groove 22b bored in the distal part of the slide plate 22. The lens frame support 24 moves together with the slide plate, whereby the lens frame 31 is driven to advance or withdraw in the Z directions. When the lens frame 31 is thrust in the direction Z1, the projection 31a presses the inner surface of the lens barrier 8 located at the position of blocking, and thus causes the lens barrier 8 to fall down in the direction of freeing.

The lens frame 32 holding the right objective has the same structure as the lens frame 31. The lens frame 32 is driven to advance or withdraw by means of the support plate 23. A projection of the lens frame 32, which is not shown, causes the lens barrier 9 to fall down in the direction of freeing.

Actions made in the binoculars 1 of the first embodiment of the present invention, which have the foregoing structure, will be described in conjunction with FIG. 3 to FIG. 5.

Figure 3:
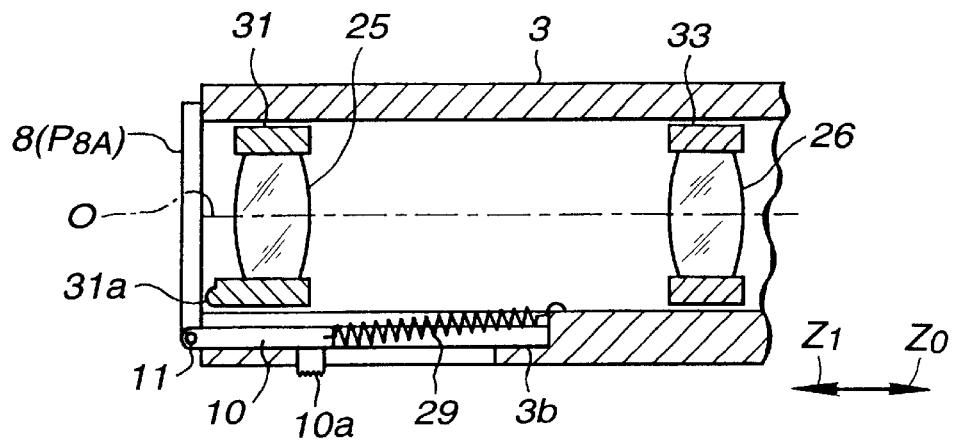
FIG. 3 is a longitudinal sectional view of a left lens frame and its surroundings in the binoculars of the first embodiment that are stowed.
Figure 4:
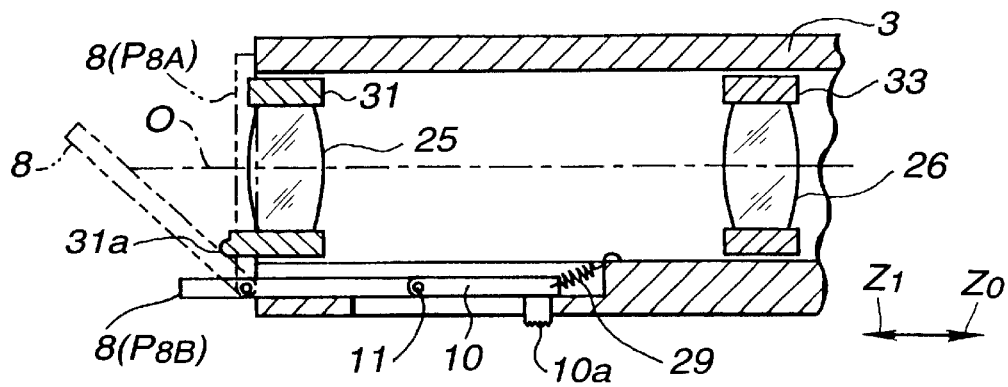
FIG. 4 is a longitudinal sectional view of the left lens frame and its surroundings in the binoculars of the first embodiment that are usable.

FIG. 3 is a longitudinal sectional view of the left lens frame and its surroundings in a lens-protected (shielded) state equivalent to the stowed state of the binoculars. FIG. 4 is a longitudinal sectional view of the left lens frame and its surroundings in a lens-freed (barrier withdrawn) state equivalent to the usable state of the binoculars. FIG. 5 graphically shows a change of the lens barrier from the closed state to the open state thereof and a change in the position in a direction of thrust of a lens in relation to the angle of rotation $\theta$ at which the focusing ring is positioned. The relationship shown in FIG. 5 is applicatable to the other embodiments described later.

Figure 5:
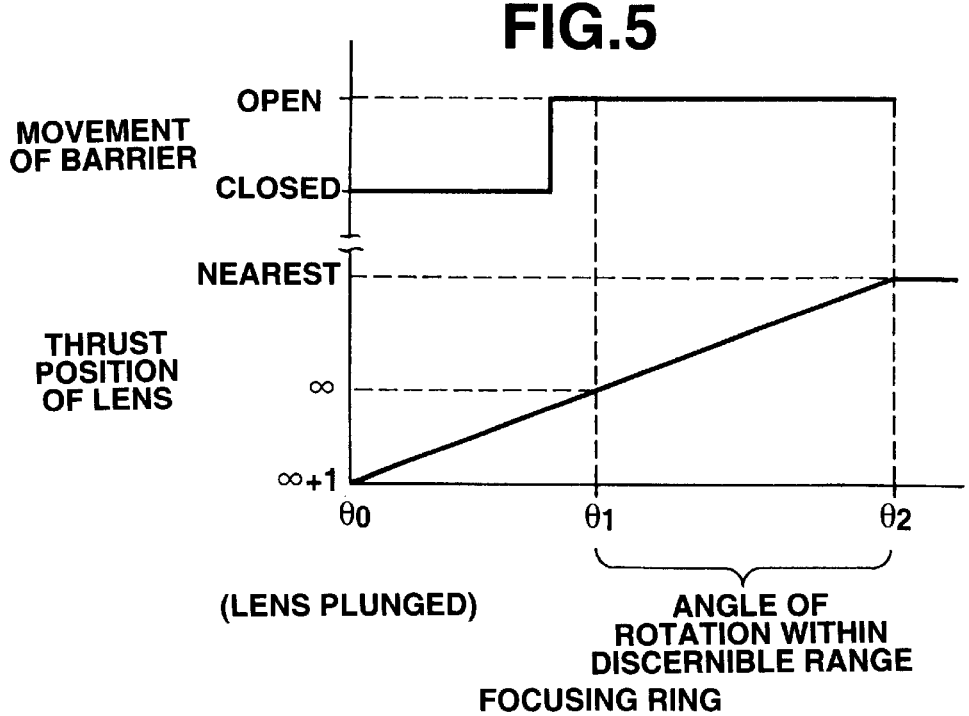
FIG. 5 shows a change of a lens barrier included in the binoculars of the first embodiment from a closed state to an open state and a change in the position in a direction of thrust of a lens in relation to an angle θ of rotation at which a focusing ring is positioned.

As shown in FIG. 5, when the binoculars 1 are stowed, the focusing ring 17 is positioned at an angle of rotation $\theta 0$. The lens frames 31 and 32 are plunged into their positions of collapse by means of the cam groove 17a and lens frame drive 20. At this time, the slide bases 10 have slid in the direction Z1 because the knobs 10a were manipulated. As shown in FIG. 3, the lens barrier 8 is located at the position of blocking P8A, and the lens barrier 9 is located at the position of blocking P9A (see FIG. 1).

For making the binoculars 1 usable, the focusing ring 17 is rotated in the direction D1 and positioned at an angle of rotation $\theta 1$. With the rotation, the drive base 21 and slide plate 22 are moved in the direction Z1. The lens frame 31 is thrust to the in-focus position for infinite focus viewing. Before the lens frame reaches the in-focus position for infinite focus viewing, that is, before the focusing ring 17 is positioned at the angle of rotation θ1, the projection 31a of the lens frame presses the lens barrier 8 in the direction Z1 as shown in FIG. 4. When the lens barrier is tilted by a predetermined angle to fall down, the constraining force produced by the spring 29 for constraining the slide base 10 to move in a certain direction operates on the slide base. The lens barrier 8 is then pulled into the stowage chamber 3a in the lower part of the left lens barrel bearing frame 3 along the guide groove 3b together with the slide base 10. In this state, the lens barrier 8 has moved to the position of withdrawal P8B. Furthermore, the lens barrier 9 has also moved to the position of withdrawal. The binoculars 1 are thus put to an observation(discernment)-enabled state (see FIG. 5).

In this state, the focusing ring 17 is further rotated in the direction D1 to an angle θ2. The lens frames 31 and 32 are thrust to their in-focus positions for the closest focus viewing. For adjusting the binoculars at accommodate user's pupil distance, the left lens frame bearing frame 3 is slid in an outward X direction. With the sliding manipulation, the slide plate 22 is moved together with the left lens frame bearing frame 3 and lens frame 31 in the X direction by means of the guide pin 3c. Consequently, the pupil distance can be modified.

For returning the binoculars 1 from the usable state to the stowed state, first, the binoculars are adjusted to the narrowest distance. However, this manipulation is not required. The pupil distance may remain wide. Thereafter, the focusing ring 17 is rotated in the direction D0 to the angle θ0. The lens frames 31 and 32 are thus plunged into the positions of collapse. The knobs 10a are manipulated in order to slide the slide bases 10 in the direction Z1. This causes, as shown in FIG. 3, the lens barriers 8 and 9 to pivot to the positions of blocking P8A and P9A (see FIG. 1).

According to the binoculars 1 of the first embodiment of the present invention, the manipulation of freeing to be performed for withdrawing the lens barriers can be interlocked with a manipulation to be performed for rotating the focusing ring for focusing the lenses. The binoculars can therefore be quickly brought to the observation-enabled state. Moreover, as mentioned above, driving the lens barriers for freeing the objectives may be interlocked with movements of the lens frames. This results in a simple barrier mechanism.

Figure 6:
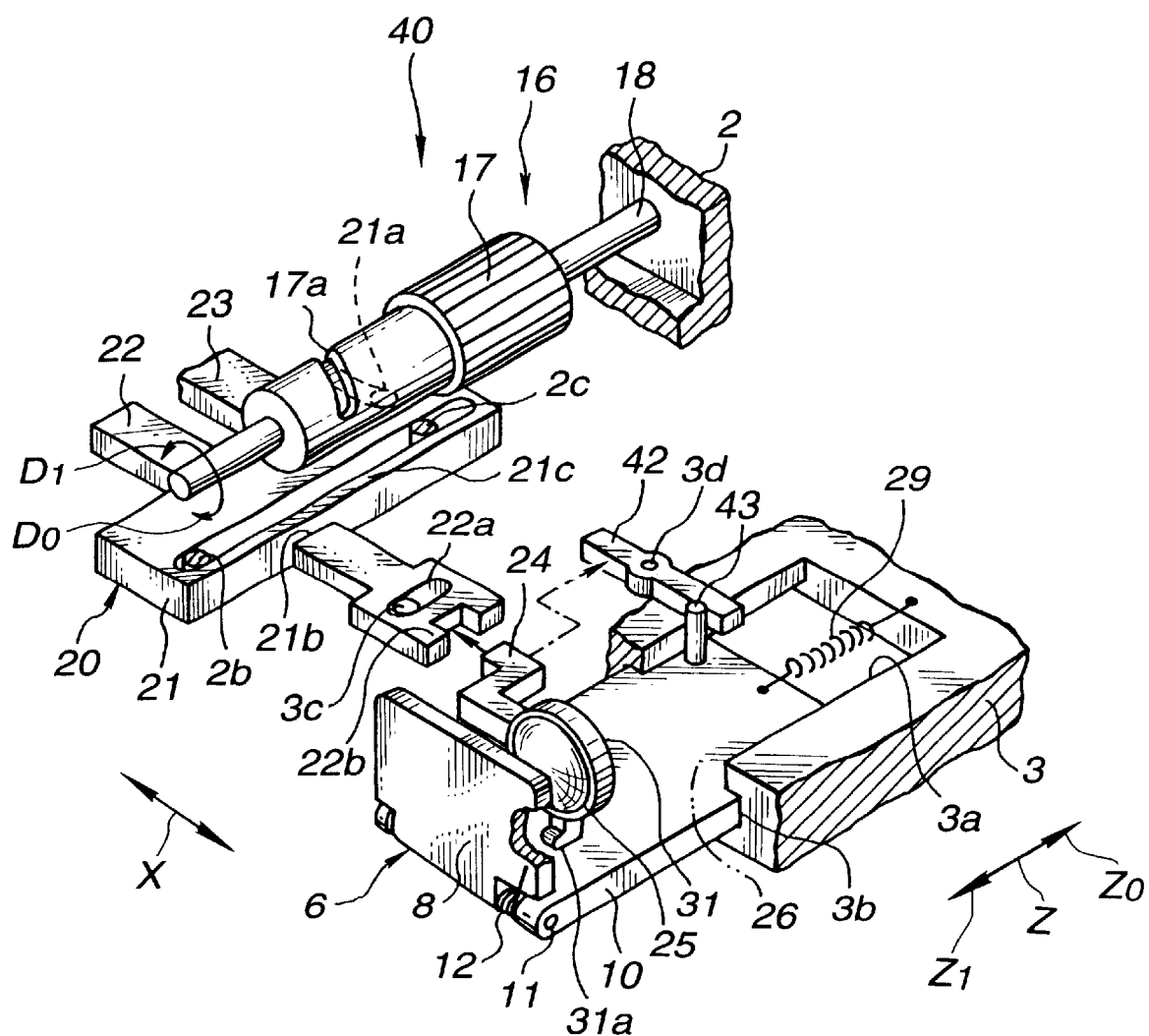
FIG. 6 is an exploded oblique view showing a lens frame drive and barrier mechanism which are incorporated in binoculars of the second embodiment.

Next, the structure of binoculars 40 will be described as that of a telescope in accordance with the second embodiment of the present invention in conjunction with FIG. 6. FIG. 6 is an exploded oblique view showing a lens frame drive and barrier mechanism incorporated in the binoculars.

In the binoculars 1 of the first embodiment, for returning the lens barrier 8 to the position of lens protection (position of blocking) P8A, the manipulation knob 10a of the slide base 10 must be manipulated. This may be annoying. In the binoculars 40 of the present embodiment, an action to be made for returning the lens barrier 8 to the position of lens protection (position of blocking) P8A is interlocked with an action to be made for plunging the lens frame 31 into the position of collapse (position of stowage). The binoculars 40 have the same components as the binoculars 1 of the first embodiment except a barrier interlocking mechanism. Only the different component will be described. The same reference numerals will be assigned to the same members.

Figure 7:
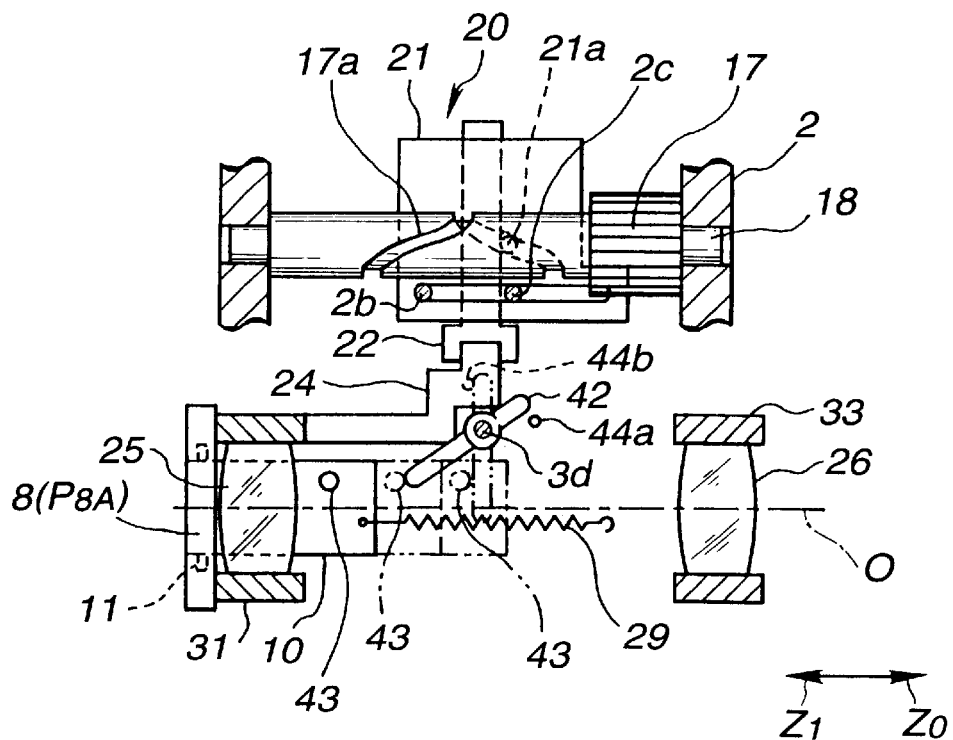
FIG. 7 is a plan view showing the interior of the binoculars of the second embodiment that are stowed with lens frames moved to their positions of collapse.

A barrier mechanism 45 for a left objective included in the binoculars 40 has a slave pin 43 fixed to the slide base 10. The knob 10a is excluded. Moreover, a support shaft 3d is fixed to the left lens barrel bearing frame 3. A slide base drive lever 42 that is a rotating member for pressing the slave pin 43 and thus driving it is supported by the support shaft 3d so that the slide base drive lever can freely swivel. Restriction pins 44a and 44b for limiting the swiveling of the drive lever 42 to a required range are placed near the drive lever, as shown in FIG. 7.

The lens frame support 24 can abut on the slide base drive lever 42. When the lens frame support 24 moves in the direction Z0 that is a direction in which the lens frame is stowed, the drive lever 42 is driven to swivel clockwise. This causes the slide base 10 to slide in the direction Z1 via the slave pin 43. With the movement of the slide base 10, the lens barrier 8 is pushed to a position at which the lens barrier can pivot in a direction in which the objective is shielded. The constraining force produced by the torsion spring 12 causes the lens barrier to pivot to the position of protection P8A.

A barrier mechanism for the right objective is not shown but has the same components as the barrier mechanism 45 for the left objective.

Figure 8:
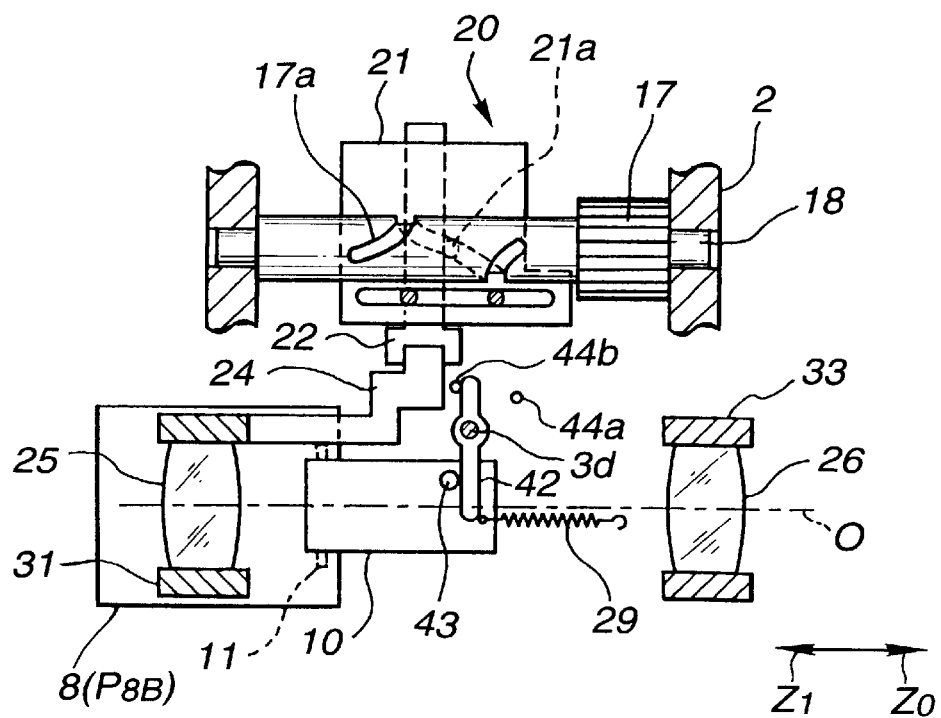
FIG. 8 is a plan view showing the interior of the binoculars of the second embodiment that are usable with the lens frames moved to their in-focus positions for infinite focus viewing.
Figure 9:
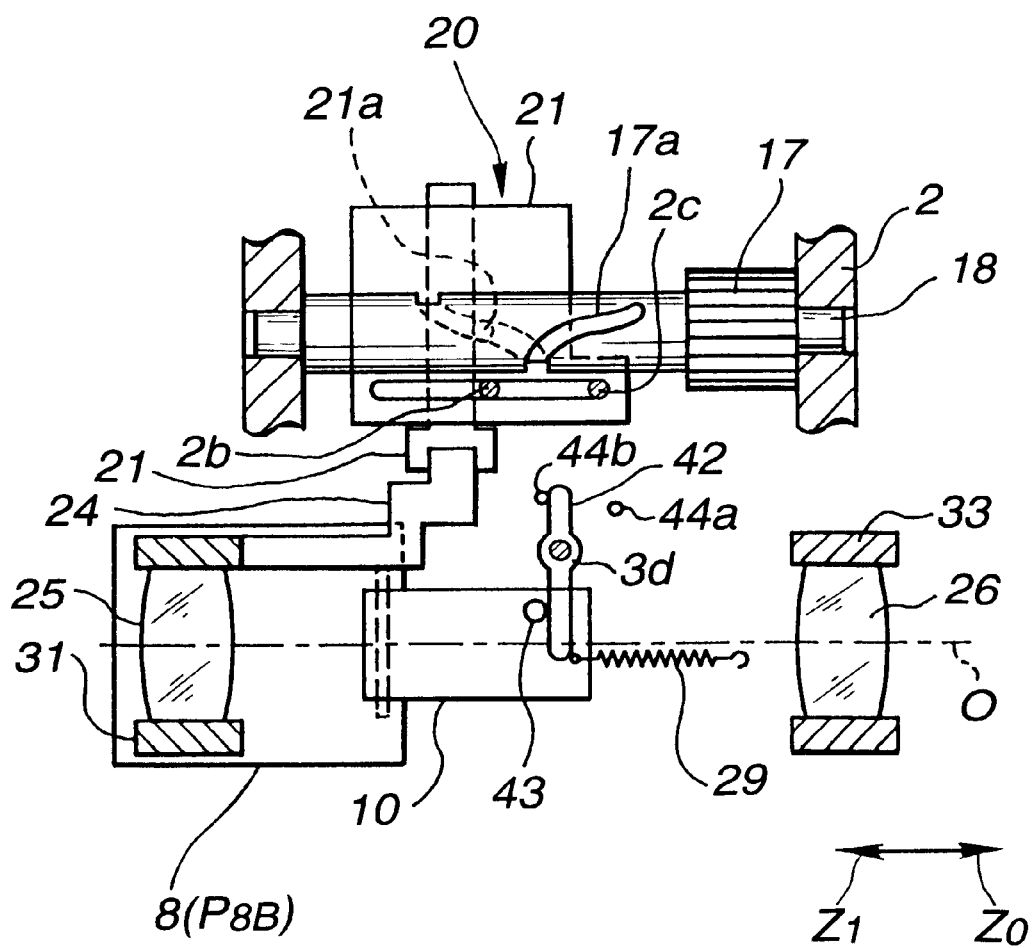
FIG. 9 is a plan view showing the interior of the binoculars the second embodiment that are usable with the lens frames moved to their in-focus positions for the closest focus viewing.

Actions to be made for opening or closing the barriers included in the binoculars 40 of the second embodiment having the foregoing components will be described in conjunction with FIG. 7 to FIG. 9. FIG. 7 is a plan view showing the interior of the binoculars 40 that is stowed with the lens frames moved to their positions of collapse. FIG. 8 is a plan view showing the interior of the binoculars 40 that is usable with the lens frames moved to their in-focus positions for infinite focus viewing. FIG. 9 is a plan view showing the interior of the binoculars 40 that is usable with the lens frames moved to their in-focus positions for the closest focus viewing. The relationship among the angle of rotation at which the focusing ring is positioned, the position of thrust to which the objective is thrust, and the movement of the barrier is identical to that graphically shown in FIG. 5.

As shown in FIG. 7, when the binoculars 40 are stowed, the focusing ring 17 is positioned at its position of stowage. The lens frames 31 and 32 are plunged into their positions of collapse. Moreover, the lens barrier 8 has pivoted in a direction of closing due to the constraining force produced by the torsion spring 12, and is retained at the position of blocking P8A. At this time, the slide base drive lever 42 has been pressed by the lens frame support 24 and rotated clockwise.

For changing the binoculars 40 from the stowed state to the usable state, similarly to that in the first embodiment, the focusing ring 17 is rotated in the direction D1 and positioned at the angle of rotation θ1. This causes the lens frame 31 to thrust to its in-focus position for infinite focus viewing as shown in FIG. 8. Immediately before the lens frame reaches the in-focus position for infinite focus viewing the lens barrier 8 is pressed by the lens frame 31 and moved to the position of withdrawal P8B. The front surface of the objective 25 is thus freed. At this time, the slide base 10 moves together with the lens barrier 8 in the direction Z0 to its position of withdrawal in the withdrawal chamber. The slide base drive lever 42 rotates counterclockwise.

In the above state, the focusing ring 17 is further rotated in the direction D1 and positioned at the angle θ2. Consequently, as shown in FIG. 9, the lens frames 31 and 32 are thrust to their in-focus positions for the closest focus viewing in the manner as they are in the first embodiment.

For returning the binoculars 40 from the usable state to the stowed state, similarly to that in the first embodiment, the focusing ring 17 is rotated in the direction D0 and positioned at the angle of rotation θ0. This causes the lens frames 31 and 32 to plunge into their positions of collapse. Along with the plunging action, as shown in FIG. 7, the lens frame support 24 withdrawing in the direction Z0 drives the slide base drive lever 42 to swivel clockwise. With the swiveling, the drive pin 43 presses the slide base 10. The slide base 10 then moves in the direction Z1.

Along with the movement of the slide base 10, the lens barrier 8 moves outward from the stowage chamber 3a of the lens barrel bearing frame 3. The lens barrier 8 then pivots due to the constraining force produced by the torsion spring 12 and lies at the position of blocking P8A. The slide base moves together with the lens barrel in the direction Z1.

In the binoculars 40 of the second embodiment, driving the lens barrier to withdraw it for freeing the objective and driving the lens barrier to the position of blocking can be initiated by manipulating the focusing ring, which is used for focusing the binoculars, to rotate it. Manipulating the binoculars to change their states from the observation-enabled state to the stowed state or vice versa can be achieved very easily.

Figure 10:
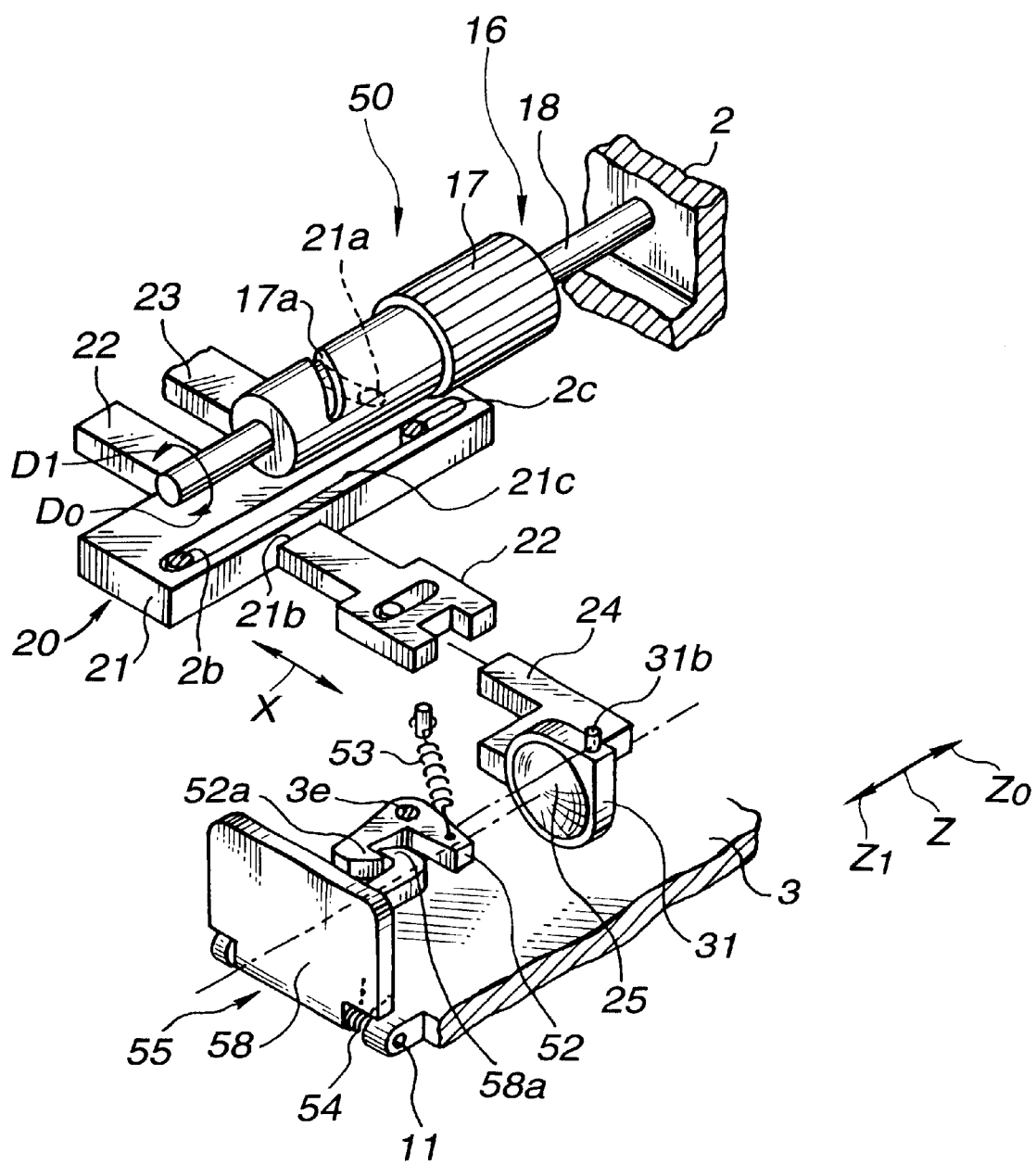
FIG. 10 is an exploded oblique view showing a lens frame drive and barrier mechanism which are incorporated in binoculars of the third embodiment of the present invention.

Next, the structure of binoculars 50 will be described as that of a telescope in accordance with the third embodiment of the present invention in conjunction with FIG. 10. FIG. 10 is an exploded oblique view of a lens frame drive and barrier mechanism incorporated in the binoculars.

In the binoculars 1 of the first embodiment, the slide base 10 is needed for plunging the lens barrier 8 into the position of withdrawal P8B, and the stowage chamber 3a is needed for stowing the lens barrier and slide base. This may cause the lens barrel bearing frame to become complex or large-sized. In the binoculars 50 of the present embodiment, neither the slide base 10 nor chamber 3a is needed. The binoculars 50 have the same components as the binoculars 1 of the first embodiment except the barrier mechanism. Only the different component will be described. The same reference numerals will be assigned to the same members.

A barrier mechanism 55 for the left objective of the binoculars 50 has a lens barrier 58 supported by a support shaft 11 fixed to the left lens barrel bearing frame 3 so that the lens barrier 58 can pivot freely. The lens barrier 58 has a claw 58a extending from an upper position on the lens-side surface thereof. The lens barrier 58 is constrained to move in a direction of freeing by means of a torsion spring 54 serving as a first constraining means.

A barrier locking lever 52 that is a rotational interlocked member has a lock claw 52a that can be engaged with the claw 58a. The barrier locking lever 52 is attached to the support shaft 3e of the left lens barrel bearing frame 3. A spring 53 that is a second constraining means for constraining the barrier locking lever 52 to move in a direction of engagement is coupled to the barrier locking lever 52. Furthermore, a pin 31b capable of pressing the barrier locking lever 52 in a direction of unlocking is fixed to the left lens frame 31.

The barrier mechanism for the right objective has the same components as the barrier mechanism 55 for the left objective, though it is not illustrated.

Figure 11:
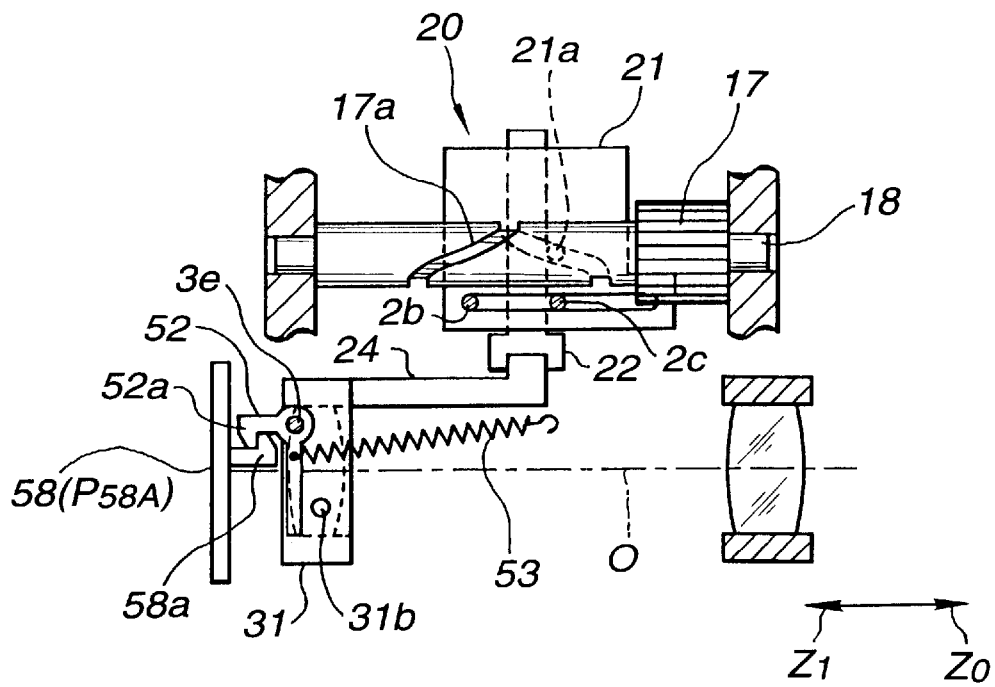
FIG. 11 is a plan view showing the interior of the binoculars of the third embodiment that are stowed.
Figure 12:
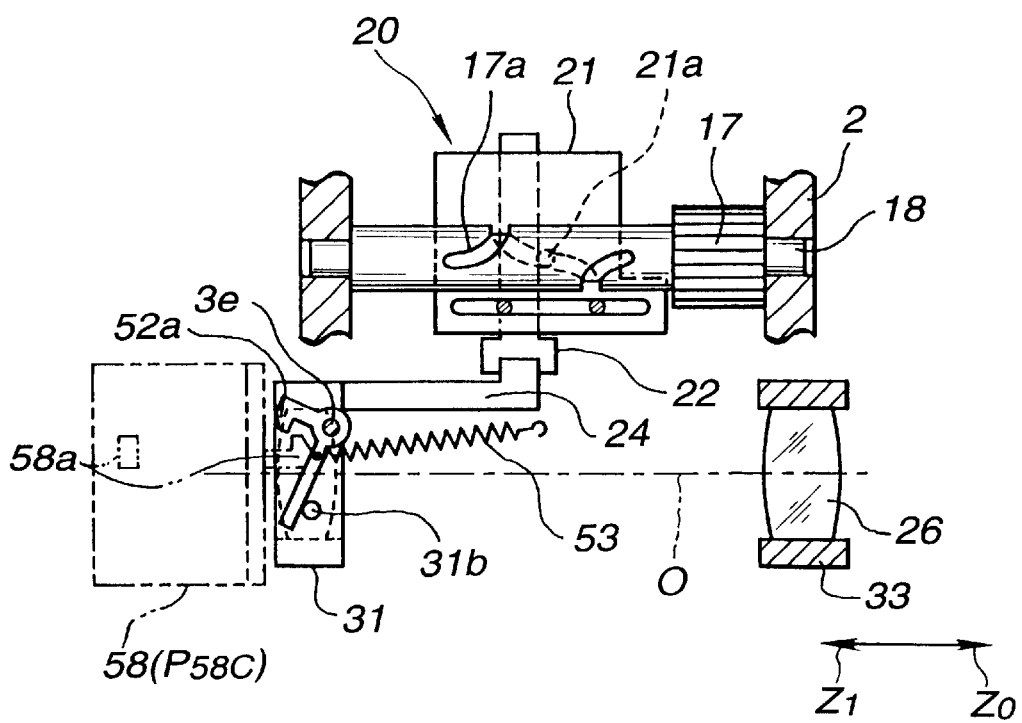
FIG. 12 is a plan view showing the interior of the binoculars of the third embodiment that are usable with the lens frames moved to their in-focus positions for infinite focus viewing.
Figure 13:
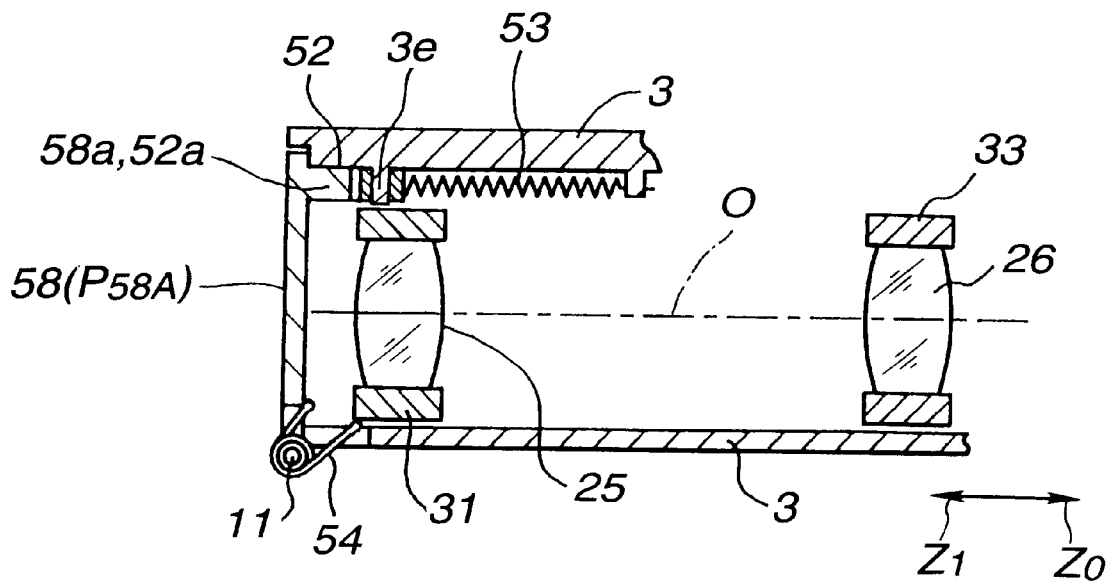
FIG. 13 is a longitudinal sectional view of a lens frame and its surroundings in the binoculars of the third embodiment that are stowed.
Figure 14:
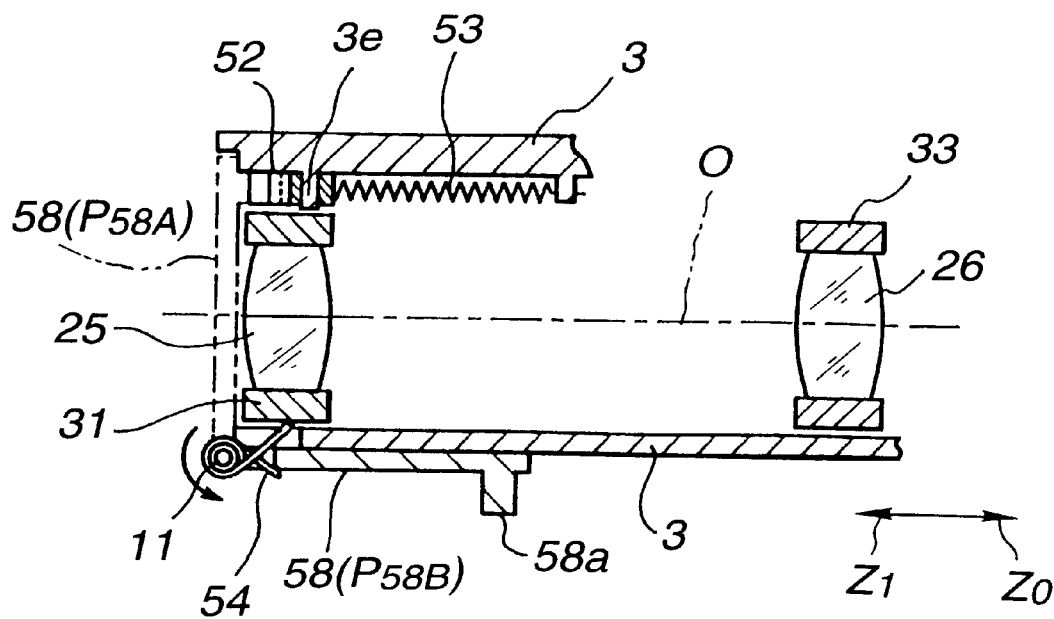
FIG. 14 is a longitudinal sectional view of a lens frame and its surroundings in the binoculars of the third embodiments that are usable.

Actions to be made for opening or closing the barrier in the binoculars 50 of the third embodiment having the foregoing components will be described in conjunction with FIG. 10 to FIG. 14. FIG. 11 is a plan view showing the interior of the binoculars 50 that are stowed. FIG. 13 are a longitudinal sectional view of a lens frame and its surroundings in the state shown in FIG. 11. FIG. 12 is a plan view showing the interior of the binoculars 50 that are usable with the lens frames moved to their in-focus positions for infinite focus viewing. FIG. 14 is a longitudinal sectional view of a lens frame and its surroundings in the state shown in FIG. 12. The relationship among the angle of rotation at which the focusing ring is positioned, the position of thrust to which the objective is thrust, and the movement made by the barrier shall be identical to the relationship graphically shown in FIG. 5.

As shown in FIG. 10 and FIG. 11, when the binoculars 50 are stowed, the focusing ring 17 are positioned at the angle of rotation θ0 to its position of stowage. The lens frame 31 has been plunged to its position of collapse. Moreover, the lens barrier 58 has the claw 58a thereof locked by the barrier locking lever 52, and is retained at its position of blocking P58A.

For changing the binoculars 50 from the stowed state to the usable state, similarly to that in the first embodiment, the focusing ring 17 is rotated in the direction D1 and positioned at the angle of rotation θ1. The lens frame 31 is thus thrust to its in-focus position for infinite focus viewing. Immediately before the lens frame reaches the in-focus position for infinite focus viewing, as shown in FIG. 12, the pin 31b presses the barrier locking lever 52 along with the movement of thrusting made by the lens frame 31. The claw 58a of the lens barrier 58 is then unlocked. The lens barrier 58 pivots due to the constraining force produced by the torsion spring 54 from its position of blocking P58A (FIGS. 11 and 13) through a middle position P58C (FIG. 12) to, as shown in FIG. 14, its position of withdrawal P58B. Consequently, the front surface of the objective 25 is freed.

The focusing ring 17 is further rotated in the direction D1 and positioned at the angle θ2. The lens frame 31 is then thrust to its in-focus position for the closest focus viewing in the same manner as that in the first embodiment.

For returning the binoculars 50 from the usable state to the stowed position, the focusing ring 17 is rotated in the direction D0 and positioned at the angle of rotation θ0 in the same manner as that in the first embodiment. The lens frame 31 is then plunged into its position of collapse. The pin 31b of the lens frame 31 moves in the direction Z0. This causes the barrier locking lever 52 to pivot counterclockwise up to a position at which it is engaged with the locked claw 58a of the lens barrier 58.

The lens barrier 58 is manipulated so that it will pivot to its position of blocking P58A in FIG. 11 against the constraining force produced by the torsion spring 54. The claw 58a of the lens barrier 58 is locked by the barrier locking lever 52. The lens barrier 58 is retained at the position of blocking P58A, and the binoculars 50 are put in the stowed state.

In the foregoing binoculars of the third embodiment, driving the lens barrier to withdraw it for freeing the objective can be achieved by rotating the focusing ring, which is used to focus the binoculars. Moreover, the stowage chamber in which the lens barrier 58 is stowed is unnecessary. This leads to a simplified barrier mechanism. Consequently, a compact lens frame can be realized.

As mentioned in the telescopes of the embodiments of the present invention, the barrier member is moved from its position of protection (position of shielding) at which it protects an optical system to its position of withdrawal (position of freeing) responsively to an action made by the optical system thrusting means. This leads to a simplified manipulation changing the binoculars to a usable state permitting observation. Consequently, the binoculars can be handled easily.

What is claimed is:

1. A telescope, comprising:

a barrier member movable to a position of protection at which it protects a front surface of an optical system incorporated in a lens barrel or a position of withdrawal at which it has withdrawn from the front surface of said optical system;

a slide member for supporting said barrier member so that said barrier member can pivot freely;

an optical system thrusting means for thrusting and moving said lens barrel from a position of non-use to a position of use;

a first constraining means for constraining said barrier member to move in a direction of closing; and a second constraining means for constraining said slide member to move in a direction substantially opposite to said direction in which said lens barrel is thrust, wherein said barrier member pivots by a predetermined magnitude in a direction towards the position of withdrawal in opposition to said first constraining means when pressed by said lens barrel; and said slide member is moved by means of said second constraining means.

2. The telescope according to claim 1, further comprising a rotating member, operatively connected to said optical system thrusting means, that rotates responsively to a thrusting action made by said optical system thrusting means, and thus moves said slide member in a direction, in which said optical member is thrust, in opposition to said second constraining means, wherein said barrier member is closed by means of said rotating member.

3. A telescope, comprising:

a lens barrel for bearing an optical system;

an optical system moving mechanism for moving said optical system between a position of non-use and a position of use; and a barrier member movable to a position of protection at which it protects a front surface of said optical system, or a position of withdrawal at which it has withdrawn from the front surface of said optical system, operatively connected to said optical system moving mechanism, said barrier member being moved between said position of protection and said position of withdrawal responsively to a manipulation performed on said optical system moving mechanism, wherein when said optical system is thrust from said position of non-use to said position of use, said barrier member is pressed by said lens barrel bearing said optical system and moved from said position of protection to said position of withdrawal.

4. A telescope, comprising:

a lens barrel for bearing an optical system;

an optical system moving mechanism for moving said optical system between a position of non-use and a position of use; and a barrier member movable to a position of protection at which it protects a front surface of said optical system, or a position of withdrawal at which it has withdrawn from the front surface of said optical system, operatively connected to said optical system moving mechanism, said barrier member being moved between said position of protection and said position of withdrawal responsively to a manipulation performed on said optical system moving mechanism, wherein said optical system moving mechanism moves said optical system between said position of non-use and said position of use, serves as a focusing mechanism that displaces a focal position of said optical system when said optical system lies at said position of use, wherein said barrier member is moved with an initial manipulation performed on said optical system moving mechanism, and wherein the focal position of said optical system located at said position of use is displaced with another manipulation performed thereon.

* * * * *